United States Patent [19]

Bareuther et al.

[11] Patent Number: 5,674,315

[45] Date of Patent: Oct. 7, 1997

[54] PROCESS FOR PREPARING A META-KAOLIN WHITE PIGMENT FROM KAOLINITE

[75] Inventors: Ernst Bareuther, Butzbach; Jochen Kauper, Maintal; Werner Stockhausen, Bad Vilbel; Martin Rahn, Frankfurt am Main, all of Germany

[73] Assignee: Metallgesellschaft Aktiengesellschaft, Frankfurt am Main, Germany

[21] Appl. No.: 659,981

[22] Filed: Jun. 7, 1996

[30] Foreign Application Priority Data

Jun. 9, 1995 [DE] Germany .................. 195 20 411.5

[51] Int. Cl.⁶ ............................................. C04B 14/10
[52] U.S. Cl. .................. 106/486; 106/484; 106/485; 501/141; 501/145; 501/149; 423/118.1; 423/328.1; 423/328.2
[58] Field of Search .................. 106/484, 486, 106/485; 501/145, 141, 149; 423/118.1, 328.1, 328.2

[56] References Cited

U.S. PATENT DOCUMENTS

| 3,519,453 | 7/1970 | Morris et al. | 106/486 |
| 5,011,534 | 4/1991 | Berube et al. | 106/486 |
| 5,393,340 | 2/1995 | Slepetys et al. | 106/484 |

*Primary Examiner*—Michael Marcheschi
*Attorney, Agent, or Firm*—Herbert Dubno; Jonathan Myers

[57] ABSTRACT

A fluidized bed reactor is supplied with fuel, oxygen-containing gas, and kaolinite, which contains water of crystallization. At least 80% by weight of the kaolinite have particle sizes in the range from 0.1 to 3 mm. A fluidized bed at temperatures in the range from 850° to 950° C. is formed in the fluidized bed reactor. A meta-kaolin white pigment which contains water of crystallization not in excess of 2% by weight is withdrawn from the fluidized bed reactor.

8 Claims, 1 Drawing Sheet

PROCESS FOR PREPARING A META-KAOLIN WHITE PIGMENT FROM KAOLINITE

FIELD OF THE INVENTION

This invention relates to a process for preparing a meta-kaolin white pigment by a thermal treatment of kaolinite, which contains water of crystallization.

BACKGROUND OF THE INVENTION

Kaolinite ($Al_2O_3.2SiO.2H_2O$) is known to release water when it is heated to about 450° C. The dehydrated kaolin ($Al_2O_3.2SiO_2$) is called meta-kaolin. Upon a further heating of the meta-kaolin to 900° C., an exothermic reaction will be initiated, by which the "so called" mullite ($3Al_2O_3.SiO_2$) is formed, which is much harder than meta-kaolin.

OBJECT OF THE INVENTION

It is the object of the invention to prepare at a low cost a meta-kaolin white pigment which is highly suitable for a wide variety of uses.

SUMMARY OF THE INVENTION

The main component of the pigment is meta-kaolin, and its mullite content is small or negligible. Preparation of the meta-kaolin white pigment is accomplished in accordance with the present invention in that a fluidized bed reactor is supplied with fuel, oxygen-containing gas, and a granular kaolinite, in which at least 80% by weight have particle sizes in the range of 0.1 to 3 mm. The kaolinite forms a fluidized bed in said fluidized bed reactor which is maintained at a temperature of 850° to 950° C., and the meta-kaolin pigment, which contains water of crystallization not in excess of 2% by weight, is withdrawn from the fluidized bed reactor. That pigment may be used e.g. as an additive in the production of glass fibers or paper and in the production of lacquers, coloring materials and other pigments.

Thus the invention is directed to a process for preparing a meta-kaolin white pigment of the Formula ($Al_2O_3.2SiO_2$) from a kaolinite of the Formula ($Al_2O_3.2SiO_2.2H_2O$) which contains water of crystallization, which comprises the steps of:

(a) granulating a fine-grained kaolinite having a particle size ranging from 0.1 to 50 micrometers to form a granular kaolinite wherein at least 80% by weight of the granular kaolinite has a particle size in the range of 0.1 to 3 mm, said granular kaolinite capable of forming a fluidized bed in a fluidized bed reactor;

(b) supplying a fluidized bed reactor with a fuel, an oxygen-containing gas and the granular kaolinite formed according to step (a) to form in said fluidized bed reactor, a fluidized bed at a temperature of 850° to 950° C., said fluidized bed having a solids throughput of 1 to 30 kg/h.;

(c) thermally treating the granular kaolinite in said fluidized bed reactor by combusting the fuel supplied according to step (b) to the fluidized bed reactor to remove the water of crystallization therefrom thereby forming a meta-kaolin white pigment which contains water of crystallization not in excess of 2% by weight; and (d) withdrawing the meta-kaolin white pigment which contains water of crystallization not in excess of 2% by weight formed according to step (c) from the fluidized bed reactor.

This process may be employed using either a stationary fluidized bed or a circulating fluidized bed. When employing a circulating fluidized bed in the thermal treatment of the kaolinite to remove water of crystallization, the following steps constitute a preferred feature:

(a) granulating a fine-grained kaolinite having a particle size ranging from 0.1 to 50 micrometers with water and a solid or liquid fuel to form a wet fuel-containing granular kaolinite wherein at least 80% by weight of the wet fuel-containing granular kaolinite has a particle size in the range of 0.1 to 3 mm, said wet fuel-containing granular kaolinite capable of forming a circulating fluidized bed in a fluidized bed reactor;

(b) at least partially drying the wet fuel-containing granular kaolinite with a hot exhaust gas from a fluidized bed reactor to remove water in a venturi mixing chamber to form a mixture of the dried fuel-containing granular kaolinite and a dust-containing exhaust gas and separating the dried fuel-containing granular kaolinite from the dust-containing exhaust gas;

(c) supplying the fluidized bed reactor with an oxygen-containing gas and with the dried, fuel-containing granular kaolinite formed according to step (b) to form in said fluidized bed reactor, a circulating fluidized bed at a temperature of 850° to 950° C., said circulating fluidized bed having a solids throughput of 1 to 30 kg/h.;

(d) thermally treating in said fluidized bed reactor, the dried, fuel-containing granular kaolinite to remove the water of crystallization therefrom by combusting the fuel to form a meta-kaolin white pigment which contains water of crystallization not in excess of 2% by weight; and (e) withdrawing the meta-kaolin white pigment which contains water of crystallization not in excess of 2% by weight formed according to step (d) from the fluidized bed reactor.

To carry out the new process the starting material is a sufficiently purified kaolinite, such as may be used also, e.g., to make porcelain. Suitable fuels which can be combusted in the fluidized bed reactor include solid, liquid and gaseous fuels, such as low-ash or ash-free fine-grained coal, light fuel oil, natural gas or methanol.

Purified kaolinite is usually available in a highly fine-grained form with particle sizes in the range of 0.01 to 50 micrometers. However, such a fine-grained material cannot be fluidized satisfactorily and can be maintained in the reactor in a stable fluidized state only with difficulty. For this reason it is recommended to granulate the fine-grained kaolinite so as to form granules, at least 80% by weight of which have particle sizes in the range of 0.1 to 3 mm. These granules may be used to form in the reactor the desired fluidized bed, in which the thermal reaction and an effective fluidization can be achieved.

In the process in accordance with the invention the thermal treatment is carried out in a fluidized bed. It is possible to form a stationary fluidized bed having a defined surface. Alternatively, a circulating fluidized bed may be employed. In either case, in an operation using a stationary fluidized bed or in an operation using a circulating fluidized bed, it is desirable to maintain the temperature in the fluidized bed constant, with a variation which is not in excess of ±15° C. Such a constancy of temperature can only be achieved in a fluidized bed if a high solids throughput (e.g. 1 to 30 kg/h) is also desired. The constancy of temperature will desirably result in the formation of a highly uniform product. Specifically, it will be possible in that case to keep the mullite content in the production of a white pigment so low that it is no longer disturbing (i.e. <2% by weight).

In the case of a stationary fluidized bed the solids throughput in the fluidized bed is the granulated kaolinite, with or without additional water. In the case of a circulating fluidized bed the solids throughput in the fluidized bed may also include granules of kaolinite and solid and/or liquid fuel with or without additional water.

The residence times of the solids in the fluidized bed reactor lie usually in the range of 0.1 to 2 hours and in most cases are about 0.5 to 1 hour. It has been found that with these relatively short reaction times the process can be carried out with a high productivity. The amount of water of crystallization still contained in the product withdrawn from the fluidized bed reactor may be determined, e.g., by measuring the weight loss suffered by the product when it is subsequently annealed.

BRIEF DESCRIPTION OF THE DRAWINGS

Further features of the process of the invention will be explained by reference to the drawings, in which.

DETAILED DESCRIPTION OF THE DRAWINGS

Figure 1:
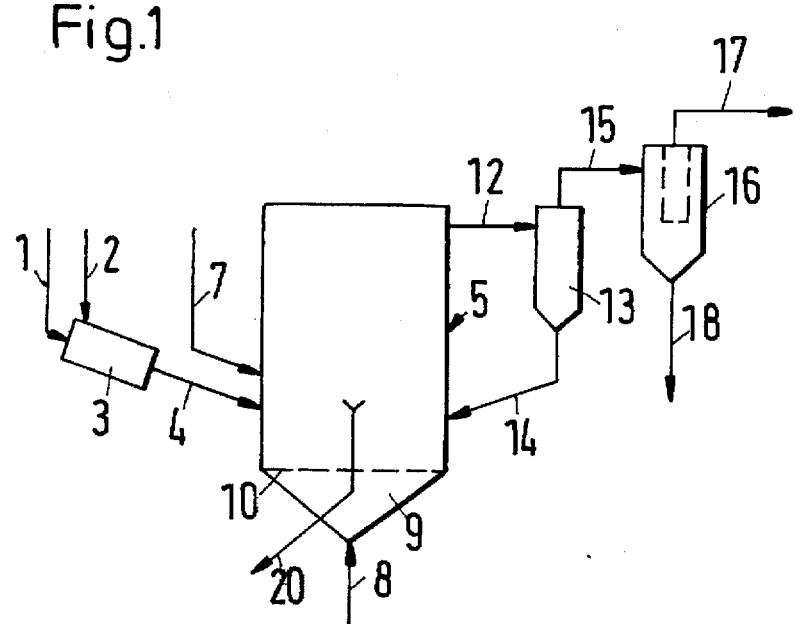
FIG. 1 is a flow diagram illustrating a process to prepare meta-kaolin white pigment from kaolinite and which includes a stationary fluidized bed.

In accordance with FIG. 1 fine-grained kaolinite is supplied to a granulator 3 through line 1 together with water supplied through line 2. Granulating may be effected by commercially available equipment, which may operate, e.g., like a tumbling barrel or a rotary disk. Granules are thus formed, which have particle sizes in the range from 0.1 to 3 mm, preferably to 2 mm. Such a granulation may usually be described as a microgranulation. The granules are supplied through line 4 to the fluidized bed reactor 5. If the water content of the granules leaving the granulator 3 is excessive, the granules may be dried in a manner which is not shown, e.g., by an admixing of dry kaolinite or of meta-kaolin filter dust.

The fluidized bed reactor 5 is supplied through line 7 with fuel, which is combusted in the reactor 5 to maintain the temperature within the described range from 850° to 950° C. On principle it is possible to use solid, liquid or gaseous fuels. For the preparation of white pigments it is essential that the formation of ash by the fuel as it is combusted will be minimized in order to avoid a discoloration of the product.

In the process illustrated in FIG. 1 a stationary fluidized bed is formed in the reactor 5. An oxygen-containing gas, particularly air or oxygen-enriched air, is supplied through line 8 and through the plenum chamber 9 and the nozzle grate 10 which enters the overlying fluidized bed. The temperature in the fluidized bed is regulated on the one hand by a control of the rate at which the oxygen-containing gas is supplied and on the other hand by the supply of fuel. A residual $O_2$ content of about 2 to 6% by volume is usually adjusted in the exhaust gas and will be relatively low so that the further treatment of the exhaust gas will be facilitated.

Dust-containing combustion exhaust gas leaves the reactor 5 through line 12 and is first subjected to a coarse dedusting in the cyclone 13. Separated solids are recycled to the reactor 5 through line 14. Thereafter the exhaust gas is conducted through line 15 to a filter unit 16, which is provided, e.g., with bag filters. Dedusted exhaust gas flows off in line 17. The filter dust is carried off in line 18. That filter dust may be recycled to the reactor 5 by means which are not shown and may particularly be supplied to the granulator 3.

After a treating time usually amounting to 0.1 to 2 hours, in most cases to 0.5 to 1 hour, finished product is withdrawn from the reactor 5 through line 20. That product is cooled in a manner known per se, which is not illustrated. Waste heat may be used to preheat the oxygen-containing gas in line 8.

Figure 2:
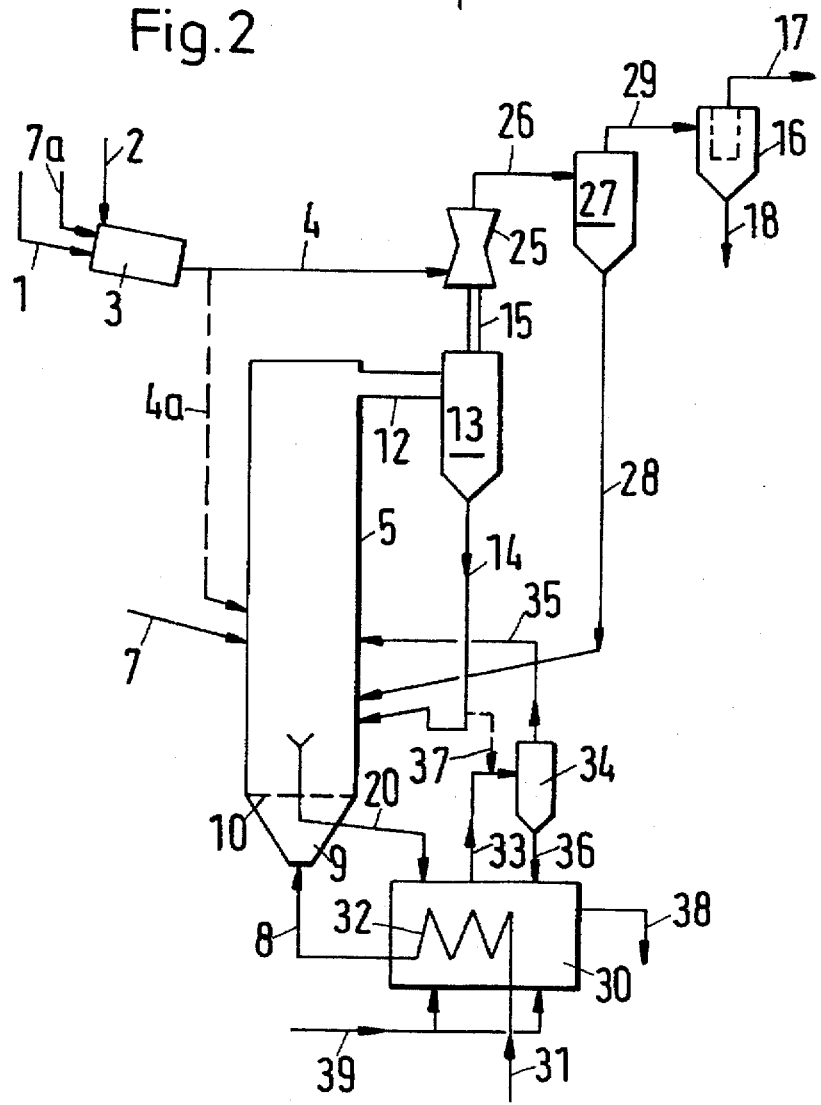
FIG. 2 is a flow diagram illustrating a process to prepare meta-kaolin white pigment from kaolinite and which includes a circulating fluidized bed.

In the variant of the process which is illustrated in FIG. 2 the granulator 3 is supplied through line 1 with fine-grained kaolinite and through line 7a with liquid or solid fuel. Water is supplied through line 2. As a result, fuel-containing granules are formed, which usually contain 10 to 30% by weight water and are carried off through line 4. To dry said granules, they are directly contacted in the venturi mixing chamber 25 with hot exhaust gas from the cyclone 13. A part of the water-containing kaolinite granules may directly be supplied to the fluidized bed reactor 5 through line 4a, which is indicated by a broken line. Additional fuel may be supplied to the reactor through line 7 for a temperature control.

In the operation of the reactor 5 shown in FIG. 2 a circulated fluidized bed is formed. Preheated oxygen-containing gas, particularly air, is supplied through line 8 to provide the oxygen which is required for the combustion in the reactor 5. Hot combustion exhaust gas together with solids is continuously discharged from the reactor 5 through line 12 and is initially conducted through the cyclone 13. Separated solids are recycled to the reactor 5 through line 14. Partly dedusted hot exhaust gas leaves the cyclone 13 through line 15 and first flows through the above-mentioned mixing chamber 25. The mixing chamber 25 essentially consists of an approximately cylindrical tube, which has in its interior a constricted cross-section to produce a venturi effect. Owing to the turbulence thus created, the granules from line 4 are entrained and are thus dried. Thereafter the granules and the exhaust gas are conducted through line 26 to a second separating cyclone 27, from which the solids are supplied to the reactor 5 through line 28. Dust-containing exhaust gas flows through line 29 to the filter unit 16. Dedusted exhaust gas is withdrawn in line 17. The dust which has been collected in the filter 16 is withdrawn in line 18 and in a manner not shown may be supplied to the granulator 3 or directly to the reactor 5.

The desired pigment is withdrawn from the reactor 5 through line 20 and is initially supplied to a fluidized bed cooler 30. To cool the solids, primary oxygen-containing gas is conducted through a line 31 and in the cooler 30 through a pipe coil 32 and the preheated gas is supplied through line 8 to the reactor 5. Secondary oxygen-containing gas is supplied in line 39 and is passed as a fluidizing gas through the cooler 30 and is withdrawn in line 33, passed through a dedusting cyclone 34 and the preheated gas is finally supplied through line 35 to the reactor 5. The solids which may have been separated in the cyclone 34 are recycled to the cooler 30 through line 36. If desired, a part of the solids may be withdrawn from line 14 through line 37 indicated by a broken line and may also be recycled to the fluidized bed cooler 30 through the cyclone 34 and line 36. Cooled finished product is withdrawn in line 38.

EXAMPLES

In the following examples, the kaolinite granules which are subjected to the thermal treatment have particle sizes in the range from 0.1 to 2 mm and are free of fuel and have been predried to have a water content of 15% by weight. A laboratory system as illustrated in FIG. 1 is employed. That system comprises a fluidized bed reactor which has a height of 1.5 meters and an inside diameter of 0.3 m. The stationary fluidized bed has a height of 0.3 mm.

Example 2 is based on a processing system as illustrated in FIG. 2 but without the fluidized bed cooler 30 and without the mixing chamber 25. Further data are apparent from the following Table:

|  | Example 1 | Example 2 |
|---|---|---|
| Kaolinite granules fed to reactor 5 | 1 kg/h | 15 kg/h |
| Primary air through line 8, rate | 5 sm$^3$/h[+) | 25 sm$^3$/h |
| and temperature | 360° C. | 500° C. |
| Temperature of grate 10 | 920° C. | 900° C. |
| Temperature in line 12 | 930° C. | 910° C. |
| Secondary air through line 35, rate | — | 7 sm$^3$/h |
| and temperature | — | 500° C. |
| Light fuel oil through line 7 | 0.15 kg/h | 1.7 kg/h |
| Product data: |  |  |
| Residence time in reactor 5 | 60 min. | 40 min. |
| Loss on annealing | 0.5% b.w. | 0.6% b.w. |
| Whiteness | 90% | 91% |

[+)sm$^3$ = standard cubic meter

The reactor 5 used in Example 2 had a height of 6 m and an inside diameter of 0.2 m. The pressure difference between the region closely above the grate 10 and the uppermost region of the reactor was 26 mbars. The fluidizing gas had a velocity of about 1 m/sec. In Example 1 the fluidizing gas a velocity of about 0.3 m/sec. The loss of the white pigment product on annealing corresponds to the residual content of water of crystallization and was determined after an annealing at 1100° C. The whiteness was measured by optical comparison.

What is claimed is:

1. A process for preparing a meta-kaolin white pigment of the Formula ($Al_2O_3.2SiO_2$) from a kaolinite of the Formula ($Al_2O_3.2SiO_2.2H_2O$) which contains water of crystallization, which comprises the steps of:
   (a) supplying a fluidized bed reactor with a fuel, an oxygen-containing gas and a granular kaolinite having a particle size in the range of 0.1 to 3 mm, wherein the granular kaolinite forms a fluidized bed in said fluidized bed reactor at a temperature of 850° to 950° C.;
   (b) thermally treating the granular kaolinite in said fluidized bed reactor by combusting the fuel supplied according to step (a) to the fluidized bed reactor to remove the water of crystallization therefrom thereby forming a meta-kaolin white pigment which contains water of crystallization not in excess of 2% by weight; and
   (c) withdrawing the meta-kaolin white pigment which contains water of crystallization not in excess of 2% by weight formed according to step (b) from the fluidized bed reactor.

2. The process for preparing a meta-kaolin white pigment defined in claim 1 wherein according to step (a) the temperature in the fluidized bed reactor is maintained constant with a variation not in excess of ±15° C.

3. The process for preparing a meta-kaolin white pigment defined in claim 1 wherein prior to step (a) a fine-grained kaolinite having a particle size ranging from 0.1 to 50 micrometers is granulated with an addition of water and the resulting wet kaolinite granules containing water are at least partially dried.

4. The process for preparing a meta-kaolin white pigment defined in claim 1 wherein the granular kaolinite has a particle size of 0.1 to 2 mm.

5. The process for preparing a meta-kaolin white pigment defined in claim 1 wherein according to step (a) the fluidized bed formed is a stationary fluidized bed.

6. The process for preparing a meta-kaolin white pigment defined in claim 1 wherein according to step (a) the fluidized bed formed is a circulating fluidized bed.

7. The process for preparing a meta-kaolin white pigment defined in claim 1 wherein according to steps (a) and (b) the granular kaolinite supplied to the fluidized bed reactor and thermally treated therein to remove the water of crystallization have a residence time of 0.1 to 2 hours in said fluidized bed reactor.

8. A process for preparing a meta-kaolin white pigment of the Formula ($Al_2O_3.2SiO_2$) from a kaolinite of the Formula ($Al_2O_3.2SiO_2.2H_2O$) which contains water of crystallization, which comprises the steps of:
   (a) granulating a fine-grained kaolinite having a particle size ranging from 0.1 to 50 micrometers with water and a solid or liquid fuel to form a wet fuel-containing granular kaolinite wherein at least 80% by weight of the wet fuel-containing granular kaolinite has a particle size in the range of 0.1 to 3 mm;
   (b) at least partially drying the wet fuel-containing granular kaolinite by contacting the wet fuel-containing granular kaolinite in a venturi mixing chamber with a hot exhaust gas from a fluidized bed reactor to remove water to form a mixture of a dried fuel-containing granular kaolinite and a dust-containing exhaust gas and separating the dried fuel-containing granular kaolinite from the dust-containing exhaust gas;
   (c) supplying the fluidized bed reactor with an oxygen-containing gas and with the dried, fuel-containing granular kaolinite formed according to step (b), wherein the dried, fuel-containing granular kaolinite forms a circulating fluidized bed in said fluidized bed reactor at a temperature of 850° to 950° C.;
   (d) thermally treating in said fluidized bed reactor, the dried, fuel-containing granular kaolinite to remove the water of crystallization therefrom by combusting the fuel to form a meta-kaolin white pigment which contains water of crystallization not in excess of 2% by weight; and
   (e) withdrawing the meta-kaolin white pigment which contains water of crystallization not in excess of 2% by weight formed according to step (d) from the fluidized bed reactor.

* * * * *